July 10, 1945.   V. BOGATICH   2,379,860
MEANS TO SUSPEND THE STRUCTURE OF A VEHICLE ON ITS WHEELS
Filed Jan. 21, 1942
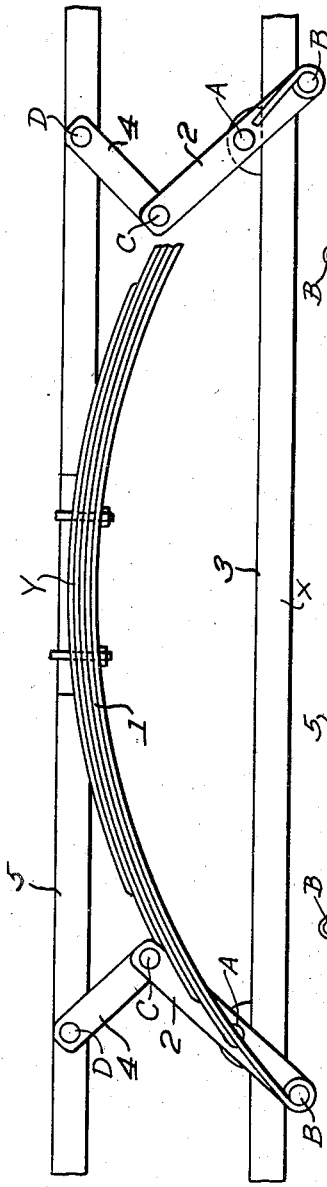
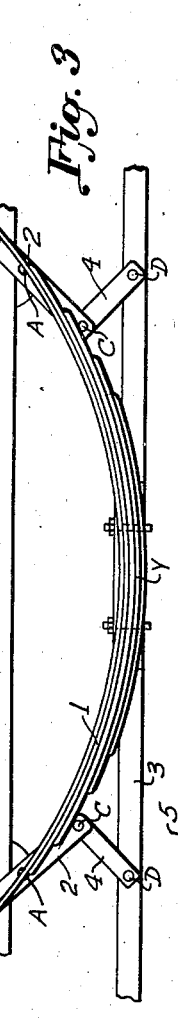
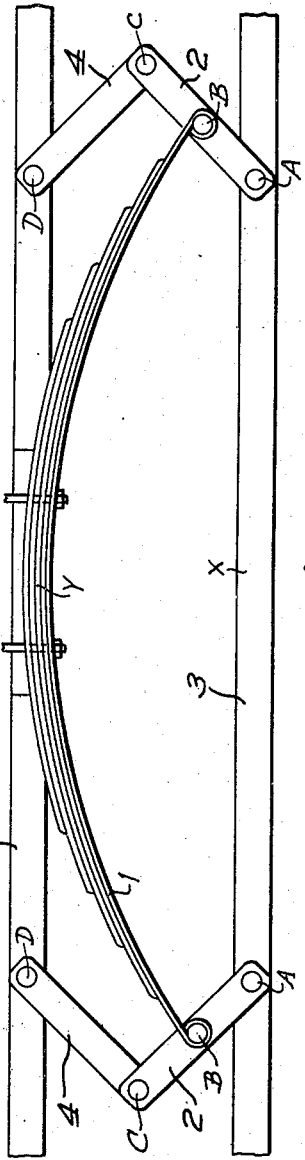
Inventor:
Vincent Bogatich Patented July 10, 1945

2,379,860

UNITED STATES PATENT OFFICE 2,379,860

MEANS TO SUSPEND THE STRUCTURE OF A VEHICLE ON ITS WHEELS

Vincent Bogatich, Detroit, Mich.

Application January 21, 1942, Serial No. 427,671

7 Claims. (Cl. 267—11)

My invention refers to a new and useful combination and arrangement of levers, links, spring, axle, and frame as the means to suspend a vehicle on its wheels.

Forming a part of this specification is a drawing in three embodiments illustrating this combination and arrangement.

The object of this invention is major and important improvement of vehicular transportation, namely, to accomplish continuous counter-poising and counterbalancing of a vehicle, while in a traveling motion.

It is further the object of this invention to maintain equal gravity pressure on opposite wheels, coupled to the same axle, while at the same time instantaneously and equally distributing added pressure caused by shock encountered by traveling over uneven road surface.

With the foregoing and other objects in view, I have devised the construction illustrated in the accompanying drawing in which Figure 1 is a front elevation of one form of the invention;

Figure 2 is a front elevation of another form, and

Figure 3 is a front elevation of still another modification.

In the embodiment shown in Figure 1 the ends of transverse spring 1, are pivoted at B to the lower ends of levers 2, which are fulcrumed on pivots A attached to the axle 3. These levers 2, at their opposite ends are pivoted at C to links 4, which in turn at their other ends D are pivoted to the frame or upperstructure 5.

In the embodiment shown in Figure 2 the ends of transverse spring 1, are pivoted at fulcrums B of levers 2, which at one end are pivoted at A to axle 3, and at the other ends C are pivoted to links 4, which at their other ends D are pivoted to the frame or upperstructure 5.

All mention herein of distance from pivots is from the centers of pivots.

In both embodiments of this invention thus described the distance AB between the pivots on levers 2, to which axle 3 and spring 1 are attached, is determined by the result obtained after distance XA measured, from the midpoint X of axle 3 to the pivot A, joining axle 3 to lever 2, is subtracted from a length YB of spring 1 measured from its midpoint Y to the pivot B at its end.

In both embodiments of this invention thus described the distance CD between the end pivots on links 4 is equal to the distance AC between the pivots on lever 2 which attach to axle 3 and links 4.

In both embodiments of this invention thus described the distance DD between the two pivots on the upper structure 5, is equal to the distance AA between the two pivots on axle 3.

In both embodiments of this invention thus described the midpoint Y of the transverse spring 1, is secured to the middle of the adjacent transverse member of the frame 5, half way between pivots to which links 4 are attached In the construction shown in Figure 3, the mechanism is inverted so that the midpoint Y of the spring 1 is fastened to the axle 3. The levers 2 are attached to the body member 5 while the links 4 are attached to the axle 3 at points DD. The fulcrums of the levers 2 are indicated at AA while the ends of the spring 1 are attached to the levers at points BB. The levers are attached to the links at points CC, and the aforementioned dimensional relations apply to Figure 3 as well as Figures 1 and 2.

The utilization of two halves instead of a single transverse spring in either embodiment of this invention is optional and when so assembled constitutes the same improvement on which I am hereby claiming Letters Patent.

The mode of operation of this invention is that any compression of the above described combination and arrangement caused by the agitation of one wheel will be expanded to the opposite side to bear on the other wheel, such expansion counteracting any unbalancing from a horizontal or level equilibrium, by reversing the direction of motion with leverage through the expansion or contraction of the spring against the suspended weight of the vehicle.

Assuming that the right-hand end of the member 3 in Figure 2 is raised by an elevation on the road, the internal angle between the right-hand members 2 and 4 becomes smaller and the internal angle between the left-hand members 2 and 4 slightly larger. The two points DD move equal distances with respect to the ground. While the spring flexes at both sides of the mid-point Y, the middle area remains in constant relation to the level of the points DD, with the result that the structure 5 carrying the points DD remains horizontal.

No additional means is required to hold the body 5 horizontal. The maintenance of the horizontal position is a function or a result of the mechanism described herein. The mechanism, being symmetrical, maintains the body 5 horizontal, obviously, while the vehicle is on level ground. The nature of the suspension is such that this original horizontal position is not disturbed by altering the angle of elevation of the axle 3.

Having thus described my invention, what I claim and desire to secure by Letters Patent is:

1. In a suspension for a vehicle having an axle member and a body member, a spring having its midpoint fastened to one of said members, a pair of links pivoted directly to the same member at link-member pivot points within compass of the ends of said spring and equidistant in opposite directions from the midpoint of said spring, a pair of levers pivoted directly to the other member at lever-member pivot points spaced apart substantially the same distance as said link-member pivot points, and to said links at lever-link pivot points, the ends of said spring being pivotally attached to said levers at spring-lever pivot points, the distance from the lever-member pivot point to the spring-lever pivot point on each lever being substantially equal to the distended half-spring length less half the distance between the two lever-member pivot points, the distance between the lever-link pivot point and the link-member pivot point on each link being substantially equal to the distance between the lever-member pivot point and the lever-link pivot point on each lever, the distance between the two link-member pivot points being substantially equal to the distance between the two lever-member pivot points, whereby said body member retains a substantially level position in compression or expansion of said spring at either end.

2. The invention defined in claim 1, wherein said spring is fastened to the body member and said levers are pivoted to the axle member.

3. The invention defined in claim 1, wherein said spring is fastened to the axle member and said levers are pivoted to the body member.

4. The invention defined in claim 1, wherein the lever-member pivot point of each lever is disposed between the spring-lever and lever-link pivot points thereof.

5. The invention defined in claim 1, wherein the spring-lever pivot point of each lever is disposed between the lever-member and lever-link pivot points thereof.

6. The invention defined in claim 1, wherein said spring is fastened to the body member and said levers are pivoted to the axle member, the lever-member pivot point of each lever being disposed between the spring-lever and lever-link pivot points thereof.

7. The invention defined in claim 1, wherein said spring is fastened to the body member and said levers are pivoted to the axle member, the spring-lever pivot point of each lever being disposed between the lever-member and lever-link pivot points thereof.

VINCENT BOGATICH.